May 31, 1955    R. J. L. NEGRE    2,709,304
APPARATUS FOR USE IN PREPARATION OF PERSPECTIVE VIEWS
Filed Oct. 16, 1953    2 Sheets-Sheet 1
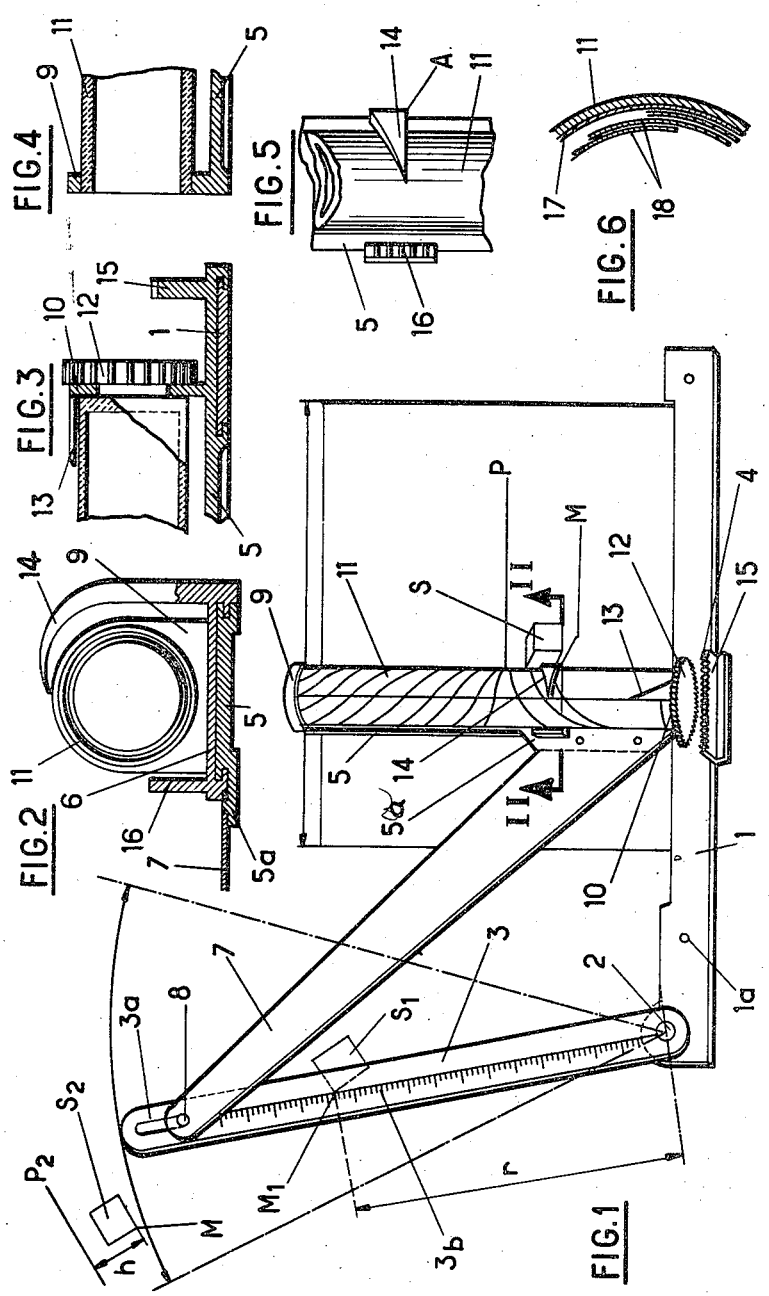
INVENTOR
RAYMOND J. L. NEGRE
BY
Holcombe Wetherill & Brisebois
ATTORNEYS

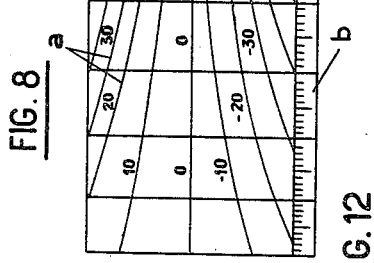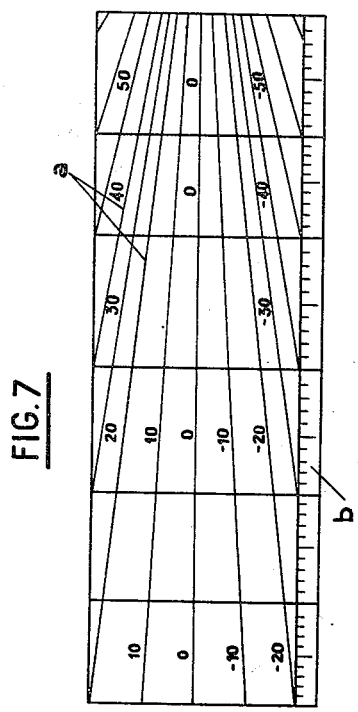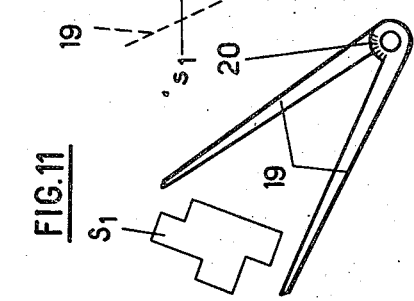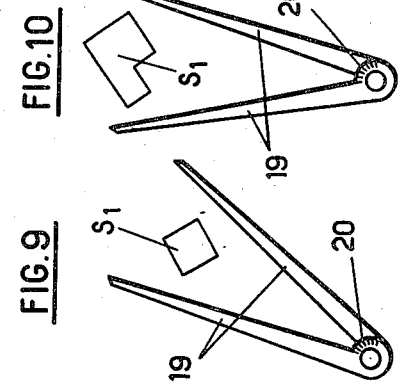

2,709,304

APPARATUS FOR USE IN PREPARATION OF PERSPECTIVE VIEWS

Raymond Jean Leon Negre, Joinville-le-Pont, France

Application October 16, 1953, Serial No. 386,641

4 Claims. (Cl. 33—77)

The present invention relates to apparatus allowing a strictly accurate perspective drawing to be obtained from two mutually perpendicular projections of an object such, for example, to take the most frequent case, as a plan view and an elevation view.

It is known that there are rules of construction which allow the position of any point in a perspective view of an object to be determined from a plan and an elevation. The application of those rules, however, is long and complicated so that in practice the draftsman uses them only for a few salient points, the rest of the view being drawn arbitrarily or from a photograph.

The invention aims at allowing the position of any desired point in the perspective view to be determined vary rapidly so that the view can be built up as precisely as is desired without requiring any particular skill from the draftsman and without calling for the use of a photograph.

The apparatus in accordance with the invention comprises essentially a carriage mounted so that it can be displaced along a rectilinear guide in accordance with the viewing angles measured from a predetermined viewing point, the said carriage carrying a secondary guide which is arranged at right angles to the guide along which the carriage is displaced and along which a cursor can be displaced opposite a rotary cylinder bearing a set of curves giving, for each real height, the apparent heights of the points in the object relatively to a reference plane in accordance with their distance or separation from the viewing point.

To make matters clear, if one considers the usual case in which one starts from the plan view of an object, one can, obviously, judiciously choose a point in that view from which the perspective will be taken, the said point being marked on the plan and referred to as the "viewing point." From that viewing point one can view any desired point in the plan and determine the corresponding viewing angle relatively to a zero reference line. There will be a particular position for the carriage on its guide which corresponds to any particular viewing angle, the guide, in the present case, being horizontal. By selecting a horizontal reference plane in the elevation, one can determine the height above that plane of the point which has been viewed in the plan.

Now, for tracing the corresponding point in the perspective view, that height has only to be modified as a function of the horizontal distance between the selected point and the viewing point. That horizontal distance, which will be called the "separation" is easily measured on the plan. It is here that the scale cylinder comes into use. This cylinder is marked, for each true height, with a curve giving the corresponding apparent height as a function of the separation. The scale cylinder is turned so that the index of the cursor is displaced along the ordinate corresponding to the measured separation and is brought on to the corresponding curve at the true height which is read from the elevation. The cursor then indicates the point sought for in the perspective.

In the preferred form of the invention, the apparatus comprises a pivoted, graduated blade which represents the line of sight and allows the separation to be measured directly, the pivot of the blade representing the viewing point. That blade is connected to the carriage in such a manner that the linear displacements of the carriage on its guide are substantially proportional to the angles of rotation of the blade. The scale cylinder is enclosed within a transparent cylinder which allows it to be easily exchanged for another. The cylinder as a whole is mounted for rotation about its axis; a cursor is arranged so that it can be caused to follow a fixed generator of the cylinder.

The apparatus formed in the manner defined above is preferably associated with a field angle measuring device formed like a pair of compasses or dividers graduated to indicate the angle of opening. This device considerably facilitates the selection of the viewing point when the angle at which the object is to be viewed, or the principal object in the case of a composite view, has been determined at least approximately. Furthermore, in the latter case, it allows one to check that none of the features which are to appear in the view moves outside the limits imposed on the size of the field by the physical characteristics of the apparatus.

The accompanying drawing, given by way of example, will allow the invention and the advantages which accrue therefrom to be better understood.

Figure 1 is a general view of apparatus according to the invention;

Figure 2 is a detail section taken on the line II—II in Figure 1;

Figures 3 and 4 are detail sections of the ends of the scale cylinder;

Figure 5 shows a detail of the cursor;

Figure 6 is a partial detail section showing the disposition of the scale cylinder and its retaining spiral within the transparent cylinder;

Figures 7 and 8 show different forms of scale charts;

Figures 9–11 illustrate the use of a field angle measuring device for selection of the most favourable disposition of the view point;

Figure 12 shows how the field angle measuring device can be used also for checking whether all the details of the view are within the admissible field; and Figure 13 shows how the field angle measuring device can be used in the elevation.

The apparatus shown in the drawings comprises a straight-edge 1, which, in order to simplify the explanation, will be assumed to be horizontal as shown. The straight-edge is fixed in a predetermined position on the drawing board and for that purpose is provided with two holes 1a adapted to receive drawing pins or other fixing means. On one of its ends (the left-hand and in the example shown) the straight-edge 1 has a pivot 2 on which can turn a transparent blade 3. That blade is provided with a scale 3b which radiates from the pivot 2 and the zero point of which coincides with the axis of the pivot. The free end of the blade 3 has a longitudinal slot 3a cut in it.

On the straight-edge 1, is freely mounted a carriage 4 to which is rigidly fixed a straight-edge 5 which forms a guide for a cursor 6. Figure 2 shows the detail of the mounting of the straight-edge 5 and its cursor 6, the straight-edge provided with two lateral grooves into which project tenons on the cursor in the manner known for example in slide rules. The straight-edge 5 has an integral lateral flange 5a to which is rigidly fixed an oblique arm 7 (for example by means of two holes into which penetrate with a high degree of friction two lugs carried by the ear). The free end of the arm 7 carries a pin 8 which passes through the above-mentioned slot 3a with as little clearance as possible.

The straight-edge 5 provides two perforated supports 9, 10 (Figures 2–4) in which is mounted for rotation a cylinder 11 of transparent material which, as will be explained further on, is destined to receive an appropriate scale chart rolled cylindrically. The lower end of the cylinder 11 has fixed to it a control knob 12 while the nearer support 10 is provided with a fixed index 13. The cursor 6 has a curved index 14 the point of which is positioned on the foremost generator of the cylinder.

Figures 2–5 show the detail of the assembly described above. It will be seen that the upper end of the cylinder 11 (Figure 4) is open to allow the scale chart to be introduced. The lower edge of the index 14 is horizontal so as to project on to the paper a well-defined right angle with the vertical face of that index. The apex of that angle is marked A in Figure 5. 15 and 16 in Figures 2, 3 and 5 designate finger grips intended to facilitate the actuation of the carriage 4 and the cursor 6.

As indicated above, the cylinder 11 is destined to receive a sheet of paper 17 (Figure 6) rolled to cylindrical form and bearing a chart giving the apparent height for each true height as a function of the separation. The sheet of paper 17 is applied to the internal wall of the cylinder 11 by a sheet 18 of an elastic substance such as a cellulose derivative also rolled to cylindrical shape. The chart proper (Figure 7) comprises a set of divergent curves $a$ combined with an abcissa scale $b$. Each curve $a$ relates to a true predetermined height (indicated by a number which is repeated along the curve in order that the chart may remain easily legible in spite of its being rolled within the cylinder 11) while the scale $b$ is the scale of separations. In order that it may not be necessary to make the cylinder 11 of excessive diameter, the chart of Figure 7 can be contracted longitudinally as shown in Figure 8, the scale of the abscissae being of no importance in connection with the utilization of the apparatus.

The apparatus which has been described operates as follows:

A viewing point is selected in the plane of the view $S_1$ of the object, which is sufficiently far away for the whole width and height of the object to be seen at the desired angle and for the details which are to be brought into prominence to be clearly visible. The pivot 2 is placed at that point and the straight-edge 1 is orientated round that pivot relatively to the view $S_1$ (or conversely the view $S_1$ is orientated round the viewing point relatively to the straight-edge 1 which is maintained at rest) so that the whole of that view $S_1$ can be swept by the blade 3. The straight-edge 1 is then fixed. Then, the horizontal plane $P_2$ in which the viewing point is to be placed relatively to the object is drawn on the elevation $S_2$. In the example shown in the drawing, the object is a cube which is to be seen from above so that the plane $P_2$ must be above the view $S_2$.

The apparatus being thus adjusted, in order to determine the position M in the perspective view of a point in the object, the blade 3 is orientated so that the trace of the scale $3b$ passes through the corresponding point $M_1$ of the plan $S_1$, which comes to the same as saying that the point $M_1$ is viewed from the viewing point which coincides with the pivot 2. The rotation of the blade 3 leads to a displacement of the carriage 4 and it is clear that the longitudinal displacements of that carriage along the straight-edge 1 are proportional to the viewing angles, such angles and displacements being measured from suitable corresponding origins as will be easily understood. Consequently, the displacement of the carriage from the origin will represent the abscissa of the point M which is sought. That abscissa can correspond to that of any point in the carriage as long as the same point is always taken for the different points of the perspective view. In fact, the point A in Figure 5 is chosen, that is to say, the apex of the right angle formed by the projection of the lower edge of the object 14 of the cursor 6 and the lateral edge of that cursor.

However, the abscissa thus obtained is obviously not sufficient to determine the position of the point M. It remains to find the position in which the cursor 6 is to be placed on the straight-edge 5. To consider matters from another angle, it can be assumed that there has been traced on the perspective a horizontal line P which represents the plane $P_2$ in which is located the viewing point in the elevation. The various points seen in perspective and, in particular, the point M, will have, relatively to that plane considered as the reference plane, ordinates which can be termed apparent heights. The problem therefore consists in finding the apparent height of a point M as a function of its true height in the elevation and of its separation in the plan.

For that purpose, the true height $h$ of the point $M_2$ in the elevation $S_2$ is first measured relatively to the reference plane $P_2$ (in this case the true height is obviously negative). The separation $r$ of the viewing point (which coincides with the pivot 2 as explained above) is then read on the scale $3b$. Then the knob 12 of the cylinder 11 is turned until the index 13 is at the level of the separation $r$ on the scale $b$ of the chart. The cursor 6 is then displaced so as to bring the point of the index 14 on to the curve $a$ corresponding to the height $h$ interpolating (of course, when that is necessary). The cursor is then in the correct position and the point M can be marked with precision at the apex designated A in Figure 5.

It is hardly necessary to say that the plane P which has been assumed to have been drawn in advance must be represented by a horizontal passing from the above-mentioned apex A when the index 14 is placed on the curve corresponding to zero height.

Instead of taking the horizontal plane $P_2$ in which the viewing point is located as the reference plane, any other horizontal plane can, of course, be selected on condition, of course, that the chart is graduated accordingly. For example, in the general case in which the perspective is to show that which the man standing on horizontal ground would see, the ground itself can be chosen as the reference plane, the viewing point then being about 5 feet from the ground. The straight line of the chart which should normally be numbered zero will then be given the number representing that height of 5 feet and "zero" will be attached to the curve which would normally be numbered to correspond to —5 feet. In this way, it will most often be possible to avoid the complication which arises out of the use of negative numbers and all the heights which are measured are heights above the ground and not above an ideal plane.

In the explanations given above, it has been assumed that one has succeeded in judiciously selecting the viewing point in the plan and its height in the elevation. In practice, that involves a somewhat fastidious tentative procedure. That can be avoided by the use of an angle transfer device formed (Figures 9–12) as dividers 19 having a scale of angles 20 determined according to any suitable system.

In use, the device is opened to the desired angle and it is passed over the plan, as shown in Figures 9–11 for various kinds of contours until the viewing point is formed which is the most appropriate from which to see the $S_1$ to the best advantage. One can thus be assured that the perspective view will be properly accommodated in the desired field and that it will occupy practically the whole of that field.

If the main object $S_1$ (Figure 12) is surrounded by subsidiary features $s_1$ which are to be represented on the drawing, the viewing point must be selected so that those features do not fall outside the maximum field determined by the dimensions of the paper on which the drawing is to be made or the required format of the drawing. In that case, a double operation is performed. First, the viewing point is selected having regard to the desired field angle for the main object $S_1$ in the manner explained above in connection with Figures 9–11, as shown in full lines in Figure 12. When that is done, the dividers are opened to the angle corresponding to the maximum field allowed by the dimensions of the sheet of drawing paper (or of the frame in which that sheet is to be mounted) as shown in broken lines at 19'; then a check is made to see that all the features $s_1$ are properly included within the legs of the dividers. It has been assumed in Figure 12 that such is the case; should that not be the case, another viewing point must be found, and perhaps, the field angle for the main object $S_1$ ultimately be somewhat reduced.

It should be noted that the same question of field arises with the elevation. But there is the difficulty here that the vertical plane passing through the viewing point and through the highest or the lowest point in the object will not, in general coincide with the plane of the elevation. For example (Figure 13) if the viewing point is at $T_1$ in the plan and the highest point in the object is at $U_1$, the vertical plane $T_1U_1$ makes an angle $\phi$ with the plane of the elevation $S_2$ and if the apex of the dividers were placed at the point $T_2$ which represents the projection in elevation of the viewing point, the dividers would have to be opened through an angle determined by the standard formula:

$$\frac{\tan \alpha}{\tan \beta} = \cos \phi$$

in which $\beta$ is the required angle of the dividers and of the true field. To avoid that difficulty, one can simply locate the apex of the dividers on the horizontal through the point $T_2$ and at a horizontal distance $U_2$ equal to the distance between $T_1$ and $U_1$ in the plan, which is equivalent to placing oneself in the vertical plane $T_1U_1$. Checks can then be made as in the case of the plane.

It is also possible to provide the dividers not with a single graduation as indicated at 20 in Figures 9 to 12 but with several graduations either proportional to particular values of the angle $\phi$ in the formula given above or to suit any other particular cases which can be envisaged.

It is also to be noted that in order to avoid having to draw the horizontal plane $P_2$ of the viewing point in the elevation, it is possible, if one works always or almost always to the same scale, to make one of the legs of the dividers of a constant width equal to the height of the viewing point above the ground measured on the adopted scale, i. e. 1.2 inches if the viewing point is 5 feet above ground level and the scale is 1/50.

The apparatus in accordance with the invention can also be used to carry out the converse operation of that described above, that is to say, to draw two mutually perpendicular views of a particular object from a perspective view of the object and, in particular, from a photograph.

It is also to be understood that the preceding description has been given merely by way of example and that that description does not limit the scope of the invention. The scope of the invention would not be exceeded by the replacement of the described details by any equivalent parts. For example, many different means can be thought of for connecting the carriage 4 to the pivoted blade 3 in such a manner that the displacements of the carriage were proportional to the angle of rotation of the blade. Likewise, although a cylindrical scale chart which can be turned is particularly advantageous and must be considered to be a special object of the invention, a plane chart restricted to a minimum width could be used, the index 14 being made long enough to enable it to cover the whole width of the chart. The field angle device is not indispensable as the appropriate viewing point can be determined by trial and error.

Moreover, in the above, it has been assumed that the pivoted blade is displaced over the plan and that the heights were obtained from the elevation. It will, however, be easily understood that the blade could be just as well displaced over the elevation and the distances of the various points in the object could be measured on the plan relatively to a vertical reference plane passing through the viewing point. More generally, the apparatus in accordance with the invention can be used in conjunction with any two projections of the object in planes at right angles to each other, however they may be oriented relatively to the horizontal plane.

I claim:

1. Apparatus for the direct determination of a perspective view from two projections of an object in planes at right angles to each other comprising a carriage arranged for displacement along a rectilinear guide as a function of the viewing angles measured from a predetermined viewing point, a secondary guide carried by said carriage at right angles to said first-mentioned guide, a cursor on said secondary guide and a rotary cylindrical chart marked with a set of curves of the apparent heights of points in the object corresponding to each true height in a reference plane as a function of the separation of those points from the viewing point, said chart being arranged alongside said secondary guide with its axis parallel to the path of movement of said cursor along said secondary guide.

2. Apparatus as claimed in claim 1 comprising also a pivoted graduated blade the pivot of which is adapted to be located at the selected viewing point and which represents the line of sight while allowing the direct measurement of the separation.

3. Apparatus as claimed in claim 2 in which the blade is connected to the carriage so that the rectilinear displacements of the latter are proportional to the angles of rotation of the blade.

4. Apparatus as claimed in claim 1 in which the cylindrical chart is removably enclosed in a transparent cylinder mounted for rotation about its axis.

References Cited in the file of this patent

UNITED STATES PATENTS

| | | |
|---|---|---|
| 1,826,338 | Ackerberg | Oct. 6, 1931 |
| 1,964,198 | Edison | June 26, 1934 |